United States Patent Office 3,558,450
Patented Jan. 26, 1971

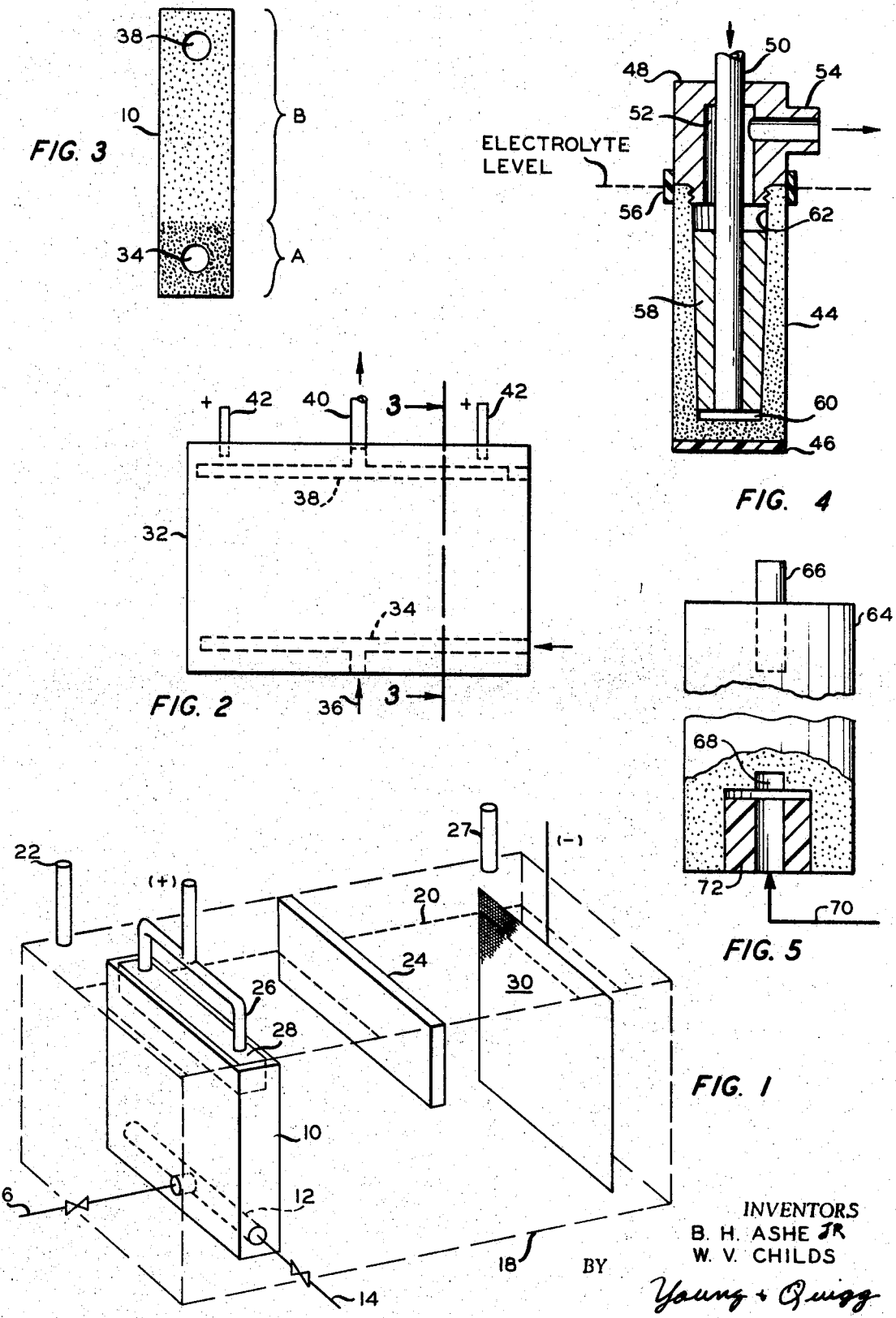

3,558,450
PROCESS FOR ELECTROCHEMICAL CONVERSION
Benedict H. Ashe, Jr., and William V. Childs, Bartlesville, Okla., assignors to Phillips Petroleum Company, a corporation of Delaware
Filed June 24, 1968, Ser. No. 739,510
Int. Cl. B01k 3/00
U.S. Cl. 204—59                                8 Claims

ABSTRACT OF THE DISCLOSURE

In an electrochemical process, the reaction takes place within the confines of a porous electrode element in which the pores of the lower portion have a lower effective size than the pores of the upper portion.

BACKGROUND OF THE INVENTION

This invention relates to electrode elements and processes for electrochemical conversions.

Porous electrode elements, particularly porous carbon anodes, are widely used in electrochemical conversion reactions. Generally the utilization of such elements has involved immersing the element in an electrolyte and passing an electric current through this electrolyte from this element to an oppositely charged element. At least a portion of the materials within the electrolyte is converted into products at one or both electrodes. In a variation on this process, an additional feedstock for the conversion process is bubbled into the electrolyte through a porous electrode element, such as a porous carbon anode, to produce still different products.

Very recently it has been discovered that the reaction in an electrochemical conversion operation can be carried out within the confines of the porous electrode element itself. This type of operation is of particular utility in electrochemical fluorination because it makes possible a simple one-step route to partially fluorinated products which had previously been difficult to obtain. Carrying out the fluorination reaction within the porous anode, in addition to making possible the direct production of partially fluorinated products, also allows operation at high rates of conversion, and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of the feed into the bulk of the electrolyte is avoided.

It is apparent that if the reaction is to take place within the electrode element, larger electrodes are desirable in order to increase the available surface area wherein the reaction takes place. However, with larger electrodes, it has been found that an uneven distribution of feed material can occur within the electrode with the result—for instance in fluorination reactions using a KF·2HF electrolyte—that in portions of the electrode farthest from the feed entry port, there is developed an excess of fluorination species and a deficiency of feed to be fluorinated. This produces unsatisfactory results among which is the production of high amounts of perfluoro materials which seriously reduce the advantage of this system for the production of partially fluorinated product.

It would appear that by drilling feed distribution channels such as lateral passages through the bottom of the electrode element, even distribution of the feed could be obtained. Thus the advantages of carrying out the reaction within the electrode, namely production of moderately fluorinated products and operation at high conversion rates without production of significant amounts of cleavage products, could be obtained in an electrode which was relatively wide and of sufficient size to be employed in a commercial scale operation. However, when attempts were made to increase the size of the electrodes still more by making them longer for deeper immersion in the electrolyte, it was found that electrode elements having such feed distribution cavities tended, after a time, to undergo invasion with electrolyte which interfered with the feed distribution and ultimately resulted in plugging with material which is solid at the operating temperature; in such instances the process either stopped or reverted to the production of a large proportion of perfluoro compounds and/or cleavage products due to the resulting uneven distribution of feed. This problem was particularly acute when the electrodes were submerged to a depth of more than about 6 inches in the electrolyte.

The invasion problem could not be solved by simply using carbons of lower porosity and smaller pore size because these tended to bubble feed into the electrolyte at these greater immersion depths and at desirable feed rates. Such "tight" carbons were also more subject to frequent polarization (anode effect) than were "loose" carbons. Polarization is an incompletely understood phenomenon wherein the resistance of the cell suddenly rises and the cell simply stops operating.

SUMMARY OF THE INVENTION

It is an object of this invention to provide an improved process and apparatus wherein the reaction in an electrochemical conversion process using a porous electrode element is carried out within the confines of the electrode element; it is a further object of this invention to prevent invasion of feed distribution channels in an electrochemical conversion electrode element; it is yet a further object of this invention to provide for uniform distribution of feed through a porous electrode element during long periods of continuous operation; it is a still further object of this invention to provide even distribution of feed material in a relatively large electrode element suitable for commercial scale use.

In accordance with this invention the effective size of the pores in the lower portion of a porous electrode element containing feed distribution channels and/or feed entry ports is lower than the effective size of the pores in the upper portion of this electrode element; this eletrode element is used in electrochemical conversions in which the reaction takes place within the confines of the porous electrode element.

BRIEF DESCRIPTION OF THE DRAWINGS

In the drawings, forming a part hereof, in which like reference characters denote like parts in the various views, FIG. 1 is a schematic representation of an electrochemical cell arrangement utilizing an electrode havnig variable or multiporosity; FIG. 2 is a schematic representation of another electrode element having multiporosity; FIG. 3 is a cross-sectional view along section lines 3—3 of FIG. 2; FIG. 4 is a view, in cross section of a variable porosity cylindrical electrode in accordance with this invention; and FIG. 5 is a side view, partially in section, of another cylindrical electrode in accordance with this invention.

DESCRIPTION OF THE PREFERRED EMBODIMENTS

The smaller effective size of the pores in the lower portion of the porous electrode element can be achieved by utilizing a porous electrode element fabricated initially with smaller pores in the lower section or by selectively plugging or partially filling the pores in the lower section, particularly the larger ones.

A porous electrode element of carbon, for instance, can be fabricated initially with smaller pores in the lower section by forming an integral unit in a conventional manner from the pyrolysis product of petroleum pitch, the usual raw material for such porous carbon, the difference being that two different particle sizes are utilized. This material is particulated, graded and mixed with a suitable binder and charged to a mold using conventional technology except that small particle size mix is placed in one end of the mold and large particle size mix is put in the other end. Alternatively two sections of anode material, one having uniformly large pores and the other uniformly small pores can be cemented together with a conventional porous cement to provide the dual porosity electrode element of the instant invention.

The specific pore size of the upper and lower sections will depend somewhat upon the immersion depth in the electrolyte intended for the electrode. That is, for use at relatively great immersion depths, the pores of the upper and lower section of the electrode should be somewhat smaller than for a corresponding shorter electrode used at relatively shallow depths. In all cases, however, the pore size of the lower section which contains the feed introduction means in the form of feed entry ports and/or distribution passageways to be protected from electrolyte invasion, should be such that the electrolyte will not migrate into said means at the specific operating depth being utilized. Similarly, the size of the pores in the upper section of the electrode should be such that will permit adequate movement of the fluid feed material without using excessive pressures which might also cause the fluid feed to break out into the bulk of the electrolyte. Generally speaking, the fine pore section of the electrode should only be large enough to enclose the ports and/or distribution passageways. For example, for a 12-inch immersion depth, a 14-inch electrode requires a fine pore section of only about 1½ inches from the bottom, such section containing the feed introduction and distribution cavities. Generally, the fine pore section comprises the bottom $\frac{1}{50}$ to ½, preferably $\frac{1}{25}$ to ⅐, of the total height of the electrode element.

The pore size in the fine pore lower section will generally be within the range of about 0.01 to 35, preferably 0.1 to 5 microns average diameter with no significant amount of pores having a diameter exceeding 70 microns. The pore size of the upper portion of the electrode element will generally be within the range of about 40 to 150, preferably 50 to 120 microns average pore diameter. The permeability of the lower portion having the fine pores will generally be within the range of about 0.001 to 4, preferably 0.02 to 0.5, darcys. The permeability of the upper portion will generally be within the range of about 5 to 75, preferably 10 to 70, darcys. In general, the permeability should complement the pore size to carry out the desired function. That is, the permeability should be high enough to prevent excessive pressure drop and the pore dimensions should be such as to discourage undesirable electrolyte penetration.

The effective pore size can also be decreased in the lower portion of an electrode of uniform pore size by impregnating the lower portion of said electrode with a polymer. Suitable polymers are normally solid polymers of at least one mono-1-olefin having 2–8 carbon atoms per molecule, and fluorocarbon polymers and copolymers. Preferred polymers are homopolymers and copolymers of ethylene, propylene and butene, and homopolymers and copolymers of tetrafluoroethylene and hexafluoropropylene.

The impregnation of the porous electrode element can be carried out by conventional means, such as by preparing a solution of the material to be impregnated and dipping or otherwise contacting the porous electrode element with such a solution. The solution can be made using solvents which will dissolve a suitable amount of the materials to be impregnated. Convenient solvents are benzene, toluene, xylene, cyclohexane, and the like, and mixtures thereof. It is also within the scope of the present invention to impregnate the porous carbon with an aqueous or nonaqueous dispersion of the finely divided polymer.

The extent of the impregnation will be such that from about 0.0125 to about 0.4, preferably from about 0.06 to about 0.2, gram of polymer will be deposited in the porous electrode material for each cubic centimeter of void space. In general, it is preferred to treat only that portion of that electrode which contains cavities used for feed entry and feed distribution. In most applications, cavities such as these are present in the lower section of the electrode, and, thus, only the lower section is treated.

After the porous carbon electrode has been impregnated with the polymer-containing medium, the electrode is then dried at temperatures below the decomposition temperature of the polymer to remove solvents and/or other volatile materials. Such drying can be carried out by conventional means such as by drying in an oven, preferably in the presence of an inert gas.

The effective pore size can also be decreased by impregnating with an organic material and subsequently carbonizing said organic material to leave a deposit of carbon.

The organic materials which are applicable for impregnation of the porous carbon are essentially any material which can be conveniently pyrolyzed leaving a carbon residue. In general, it is more efficient to pyrolyze relatively nonvolatile materials such as polymers. A particularly preferred material is polymerized vinylidene chloride (commercially known as Saran). This material pyrolyzes cleanly at relatively low temperatures by the loss of hydrogen chloride leaving carbon behind. Other materials which can be used are poly(vinylidene fluoride), furfural polymer, cellulose nitrate, cellulose acetate, and the like.

The impregnation of the porous carbon can be carried out by conventional means, such as by preparing a solution or dispersion of the material to be impregnated and dipping or otherwise contacting the porous carbon with such a solution or dispersion. The solution can be made using solvents which will dissolve a suitable amount of the material to be impregnated. Some convenient solvents are acetone, methyl ethyl ketone, benzene, toluene, and the like, and mixtures thereof, depending upon the specific materials to be dissolved.

The extent of the impregnation will be such that from about 0.0125 to about 0.4, preferably from about 0.06 to about 0.2, gram of carbon will be deposited in the porous electrode material for each cubic centimeter of void space.

The pyrolysis of the impregnated porous carbon material can be carried out by subjecting the porous electrode element impregnated with said organic material to a sufficiently high temperature and for a sufficient time to decompose the impregnant to carbon with the simultaneous removal of any gaseous by-products. The pyrolysis is carried out in the absence of air and generally in the presence of an inert gas. For example, when poly(vinylidene chloride) is used as the impregnant, the pyrolysis conditions can be 350° C. or higher for several hours in the presence of a flowing inert gas such as nitrogen.

In embodiments where the pores in the lower section are treated, this can be done either before or after the formation of feed entry ports and/or distribution passageways.

The porous element of the electrode assemblies of the invention can be fabricated from any suitable conducting porous electrolyte resistant material which is compatible with the system, e.g., nickel, iron, various metal alloys, and carbon, which is not wetted by the electrolyte. By "not wetted" is meant that the contact angle between the electrolyte and the electrode must exceed 90° in order that anticapillary forces will prevent substantial invasion of the small pores of the porous element by the electrolyte. Porous carbon, which is economical and readily available in ordinary channels of commerce, is presently preferred for said porous element. In many instances it may be advantageous to provide a metal element in contact with the porous element. For instance, a porous carbon anode can have a nickel screen wrapped around it.

Various grades of porous carbon can be used in the practice of the invention. It is preferred to employ porous carbon which has been made from carbon produced by pyrolysis, and not graphitic carbon. Suitable porous carbons for the embodiments of the invention employing impregnation of the electrode elements are, broadly, those having average pore diameters within the range of from 1 to 150 microns and a permeability within the range of 0.5 to 75 darcys. Carbons which will benefit most from the invention will have an average pore diameter of 40–140, preferably 50–120, microns, and a permeability of 5–75, preferably 10–70, darcys. The electrodes of the invention can be fabricated in any suitable shape or design, but must be arranged or provided with a suitable means for introducing the feed reactant material into the pores of the porous element thereof.

The electrode assemblies of the invention can be employed in any convenient cell configuration or electrode arrangement. The only requirements are that the cell body and the electrodes in the cell be fabricated of materials which are resistant to the action of the contents' of the cell under the reaction conditions. Materials such as steel, iron, nickel, polytetrafluoroethylene (Teflon), carbon, and the like, can be employed for the cell body. When a nonporous cathode or a nonporous anode is employed which is not fabricated in accordance with this invention (along with a porous anode or a porous cathode of the invention), said nonporous cathode or nonporous anode can be fabricated in any suitable shape or design and can be made of any suitable conducting material such as iron, steel, nickel, alloys of said metals, and carbon. For example, a nonporous cathode can be fabricated from a metal screen or gauze, a perforated plate, and can have a shape complementary to the shape of the porous anode.

The electrode assemblies of the invention can be employed in a wide variety of electrochemical conversion processes in which the porous electrode is not wetted by the particular electrolyte being used and wherein the reaction takes place within the pores of the porous electrode element. Some examples of such processes are electrochemical halogenation, electrochemical cyanation, and cathodic conversions such as the reduction of alcohols to hydrocarbons or the reduction of acids to alcohols. One electrochemical conversion process in which the electrode assemblies of the invention are particularly valuable is the electrochemical fluorination of fluorinatable materials in the presence of an essentially anhydrous liquid hydrogen fluoride-containing electrolyte. Thus, for purposes of convenience, and not by way of limitation, the electrode assemblies of the invention are primarily described in terms of being employed as an anode in the electrochemical fluorination of fluorinatable materials when using said hydrogen fluoride-containing electrolyte.

By preventing excessive invasion of the electrode element with consequential flooding and blocking of the feed introduction area, the instant invention allows operating with larger electrode elements which can be more deeply immersed in the electrolyte. With the passages within the electrode element suitably protected in this manner, the major portion of the elements can comprise the relatively large pore material which is more suitable as a reaction zone and which is less often subject to polarization.

As referred to hereinabove, the instant invention is of particular utility in the electrochemical fluorination wherein a current-conducting essentially anhydrous liquid hydrogen fluoride electrolyte is electrolyzed in an electrolysis cell provided with a cathode and a porous anode (preferably porous carbon), a fluorinatable organic compound is introduced into the pores of said anode and therein at least a portion of said organic compound is at least partially fluorinated within the pores of said anode, and fluorinated compound products are recovered from said cell. The present invention provides improved electrode assemblies which are especially suited to be employed as anodes to produce partially fluorinated materials and/or to fluorinate organic compounds with little or no scission of carbon to carbon bonds.

Very few organic compounds are resistant to fluorination. Consequently, a wide variety of feed materials, both normally liquid and normally gaseous compounds, can be used as feedstocks in this process. Organic compounds which are normally gaseous or which can be introduced in gaseous state into the pores of a porous anode under the conditions employed in the electrolysis cell, and which are capable of reacting with fluorine, are presently preferred as starting materials. However, starting materials which are introduced into the pores of the anode in liquid state can also be used. Generally speaking, desirable organic starting materials which can be used are those containing from 1 to 8, preferably 1 to 6, carbon atoms per molecule. However, reactants which contain more than 8 carbon atoms can also be used. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, argon, krypton, neon, xenon, nitrogen, etc. Normally gaseous materials such as hydrocarbons containing from 1 to 4 carbon atoms can also be used as carrier gases. These latter gases will react, but in many instances this will not be objectionable. The above-described carrier gases, and particularly said inert gases, can also be used as diluents for the feedstocks which are normally gaseous at cell operating conditions.

Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from 1 to 6 carbon atoms per molecule. The presently more preferred starting materials are the normally gaseous organic compounds, and particularly said saturated and unsaturated hydrocarbons, containing from 1 to 4 carbon atoms per molecule.

Since fluorine is so reactive, no list of practical length could include all starting materials which can be used. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexene-2; butadiene; vinyl chloride; 3-fluoropropylene; acetylene; methylacetylene; vinylacetylene; 4,4-dimethylpentyne-2; allyl chloride; methylamine; ethylamine; diethylamine; 2-amino-3-ethylpentane; 3-bromopropylamine; triethylamine; dimethyl ether; diethyl ether; methyl ethyl ether; methyl vinyl ether; 2-iodoethyl methyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylene-bromohydrin; benzene; toluene; cumene; o-xylene; p-xylene; and monochlorobenzene.

In addition to such fluorinatable organic materials described above, carbon monoxide and oxygen can be used as feedstocks to produce carbonyl fluoride and oxygen difluoride, respectively.

The electrochemical fluorination process is carried out in a medium of hydrogen fluoride electrolyte. Although said hydrogen fluoride electrolyte can contain small amounts of water, such as up to about 5 weight percent, it is preferred that said electrolyte be essentially anhydrous. The hydrogen fluoride electrolyte is consumed in the reaction and must be either continuously or intermittently placed in the cell.

Pure anhydrous liquid hydrogen fluoride is nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulphuric acid and phosphoric acid. Potassium fluoride, cesium fluoride, and rubidium fluoride the the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas $KF \cdot 2HF$, $KF \cdot 3HF$, or $KF \cdot 4HF$. Such electrolytes can be conveniently prepared by adding the required quantity of hydrogen fluoride to $KF \cdot HF$ (potassium bifluoride). In general, said additives are not consumed in the process and can be used indefinitely. Said additives are frequently referred to as conductivity additives for convenience.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from minus 80 to 500° C. at which the vapor pressure of the electrolyte is not excessive, e.g., less than 250 mm. Hg. It is preferred to operate at temperatures such that the vapor pressure of the electrolyte is less than about 50 mm. Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60 to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure. It should be pointed out that a valuable feature of the process is that the operating conditions of temperature and pressure within the limitations discussed above are not critical and are essentially independent of the type of feed employed in the process.

For purposes of efficiency and economy, the rate of direct current flow through the cell is maintained at a rate which will give the highest practical current densities for the electrodes employed. Generally speaking, the current density will be high enough so that anodes of moderate size can be employed, yet low enough so that the anode is not corroded or disintegrated under the given current flow. Current densities within the range of from 30 to 1000, or more, preferably 50 to 500, milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide, voltages in the range of 4 to 20 volts per unit cell can be used.

As used herein unless otherwise specified, the term "anode geometric surface" refers to the outer geometric surface area of the porous carbon element of the anode which is exposed to electrolyte and does not include the pore surfaces of said porous element.

The feed rate of the fluorinatable material being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Gaseous feed rates which can be employed will preferably be in the range of from 0.5 to 10 milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). On this basis, the flow rates can be 3–600, preferably 25 to 500, milliliters per minute per square centimeter of cross-sectional area.

The actual feed rate employed will depend upon the type of carbon used in fabricating the porous element of the anode as well as several other factors including the nature of the feedstock, the conversion desired, current density, etc., because all these factors are interrelated and a change in one will affect the others. The feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these flow rate conditions there is established a pressure balance between the feedstock entering the pores of the anode from one direction and electrolyte attempting to enter the pores from another and opposing direction. This pressure balance provides an important feature in that essentially none of the feed leaves the anode to form bubbles which escape into the main body of the electrolyte. Essentially all of the feedstock and/or reaction product travels within the carbon anode via the pores therein until it reaches a collection zone within the anode from which it is removed via a conduit, or until it exits from the anode at a point above the surface of the electrolyte.

The more permeable carbons will permit higher flow rates than the less permeable carbons. Similarly, electrode shapes, electrode dimensions, and manner of disposal of the electrode in the electrolyte will also have a bearing on the flow rate. Thus, owing to the many different types of carbon which can be employed and the almost infinite number of combinations of electrode shapes, dimensions, and methods of disposal of the electrode in the electrolyte, there are no really fixed numerical limits on the flow rates which can be used. Broadly speaking, the upper limit on the flow rate will be that at which "breakout" of feedstock and/or fluorinated product begins along the immersed portion of the electrode element. Herein unless otherwise specified, "breakout" is defined as the formation of bubbles of feedstock and/or fluorinated product on the outer immersed surface of the anode (electrode) with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine.

While the feed introduction means is protected from electrolyte invasion by the instant invention, there must be some penetration of the pores of at least the outermost portion of the electrode element where the reaction can take place. The above-described pressure balance will permit some migration of electrolyte into the pores of the anode. The amount of said migration will depend upon the inlet pressure of the feedstock but mostly upon the pore size. The larger size pores are mainly responsible for the electrolyte invasion into the electrode element cavities. It has been found that porous carbon anodes as described herein can be successfully operated when up to 40 to 50 percent of the pores, of what is primarily the reaction zone, have been filled by liquid HF electrolyte so long as the electrode passages, in what is primarily the feed zone, can be kept clear.

The feed material and the products obtained therefrom are retained in the cell for a period of time which is generally less than one minute. Because the residence time is comparatively short and is especially uniform, the production of the desired products is facilitated. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen, produced at the cathode, can be burned to provide heat energy or can be utilized in hydrogen-consuming processes such as hydrogenation, etc.

Referring now to the drawings, particularly FIG. 1, there is shown in schematic representation a complete electrochemical conversion cell having a porous electrode element 10 having the general shape of a rectangular block. A first passageway 12 extends longitudinally into and substantially across said block adjacent the lower end thereof. The interior wall of said passageway 12 comprises a first surface for the introduction of a feed material from first conduit 14 into the pores of said porous element 10. Depending upon the size and configuration of porous element 10, more than one passageway 12 can be provided. Also, if desired, the feedstock can be introduced into the center of passageway 12 by means of conduit 16. Said porous element 10 is disposed in a cell container 18. The upper end of said porous electrode element is above the level of the electrolyte in said container as depicted by reference character 20. Thus, the upper end surface of porous electrode element 10 comprises a second surface for withdrawing unreacted feedstock and product from the pores of the porous electrode element 10. Conduit 22 comprises a second conduit means for withdrawing product and unreacted feedstock from within the pores of porous electrode element 10. If desired, the space above the electrolyte can be divided by a partition 24 extending from the top of the cell to below the level of the electrolyte to keep the anode products separated from the cathode products; or, a conventional cell divider can be employed to divide the cell into an anode compartment and a cathode compartment. However, such a divider is not essential and can be eliminated. A current collector 26 comprising a pair of metal bars extends into the top portion of porous electrode element 10. If desired, a metal insert 28 can be provided in the top portion of electrode element 10 to increase current collection efficiency. A cathode 30, fabricated of any suitable metallic material such as a screen, perforated plate, etc., is disposed in said cell as indicated. Cathode products can be removed via conduit 27.

In FIG. 2, porous electrode element 32 has the general shape of a rectangular block. A first passageway 34 extends longitudinally into and substantially into and across said block adjacent to the lower end thereof. The surface of said passageway 34 comprises a first surface for introduction of the reactive feedstock into the pores of porous electrode element 32. First conduit 36 extends into said block and into communication with said first passageway 34 at about the midpoint thereof. If desired, the feed conduit can be connected to one end of passageway 34 as indicated. However, it is preferred to plug the open end of passageway 34 and introduce the feedstock at about the midpoint of said passageway by conduit 36. A second passageway 38 extends longitudinally into and substantially across said block adjacent the upper end thereof. Said second passageway comprises a collection lateral and the surface thereof provides a second surface for withdrawing products and unreacted feedstocks from within the pores of said porous electrode element 32. Anode effluent conduit 40 is connected into about the midpoint of passageway 38 as shown. If desired, depending upon the size and configuration of porous electrode element 32, more than one passageway 34 and more than one passageway 38 can be provided. Current collectors 42, comprising metal rods, extend into the upper end of porous electrode element 32. Referring now particularly to FIG. 3 there is shown in cross-sectional view the electrode element of FIG. 2. As can be seen from FIG. 3 porous electrode element 10 is comprised of two sections, section B having large pores and section A having either small pores or pores similar to those of section B, but which have been treated according to the present invention.

Referring now to FIG. 4 there is shown an alternate embodiment of the electrode assembly of the instant invention. This assembly has a porous electrode element 44 in the general shape of a hollow tube, closed at one end thereof and open at the other end. The bottom of said porous electrode element is sealed with a suitable resistant cement material 46 such as Fluoroseal. Said porous electrode element 44 is mounted onto the lower end of a generally tubular cap 48 by means of the threads shown. Any other suitable means for attaching porous element 44 to cap 48 can be employed. Said cap 48 can be fabricated from any suitable metal such as brass or suitable plastic such as Teflon (trademark). A first conduit 50 extends through said cap 48 into the lower portion of the interior of porous element 44 to a point adjacent said closed end thereof. The outlet of said conduit 50 is thus in communication with the bottom interior surface which comprises a first surface of said porous element 44 for the introduction of feedstock into the pores of said porous electrode element 44. An annular space 52 surrounds said first conduit 50 where it passes through said cap 48. A second conduit 54 extends outwardly from said cap 48 and is in communication with said annular space 52. It will be noted that via said annular space 52 said conduit 54 is also in communication with the upper portion of the interior wall of said porous element 44. Said upper portion of said inner wall comprises a second surface of said porous electrode element 44 for the withdrawal of products and any unreacted feedstock from said porous element. The electrode assembly is shown as being positioned in a body of electrolyte. If desired, the region where the said porous element 44 joins cap 48 can be covered with an external seal 56, such as Teflon (trademark) tape. This seal is preferably provided at the area of the electrolyte level as shown. A metal plug 58 is mounted on the lower end portion of said first conduit 50 in a close fitting relationship with the inner wall of said porous electrode element 44. Said metal plug thus divides the inner wall of said porous electrode element 44 into a lower first surface and an upper second surface. Said lower first surface can be defined as comprising the chamber 60 which is formed at the lower end of conduit 50. Said upper second surface can be defined as the portion 62 of the inner wall of porous element 44 which is in communication with annular space 52. This provides a positive arrangement for forcing feed material into the pores of porous element 44. Said feed material is thus forced to enter the pores by said first surface (the walls of chamber 60), pass upwardly through the network of pores in porous electrode element 44, and exit from said pores through said second surface 62. As can be seen from FIG. 4 the size of the pores is relatively small in the area of lower chamber 60 and gradually becomes larger going from the portion of said electrode elements surrounding chamber 60 to the upper portion of said electrode element as depicted by upper wall portion 62 which forms said second surface.

Referring now to FIG. 5 there is shown a cylindrical electrode element 64 having a current collector 66 embedded in the upper, large pore diameter portion thereof. Feed is introduced into cavity 68 in the lower, small pore diameter portion of electrode element 64 via line 70. Cavity 68 is sealed from the bulk of the electrolyte by means of Teflon plug 72.

Many conventional parts such as temperature controllers, electrical apparatus, recovery equipment, and the like have not been shown for the purpose of simplicity, but the inclusion of such equipment is understood by those skilled in the art and is within the scope of the invention.

Example I

A cylindrical porous carbon anode 1⅜ inches in diameter and 14 inches long was connected to a copper current collector at its upper end and was drilled and tapped at its lower end to provide for a fitting and connection for the introduction of liquid ethylene dichloride feed. After the bottom fitting had been installed, a small void, ¼ x ¼ inch, was present, located about one inch from the bottom of the anode. The anode material was a conventional porous carbon material (National Carbon Co. PC 45) which had an effective porosity of about 48 percent, an average pore diameter of about 58 microns, and a permeability of about 20 darcys.

A solution of high-density polyethylene was prepared by adding as much of the polymer as could be dissolved in boiling toluene. The anode was preheated and the bottom 1¼ inches was impregnated by being dipped into the polymer solution. The anode was then dried in an oven at 110° C. for one hour, and it was found that 0.5 g. of polymer had been deposited in the pores of the carbon. This was about 0.03 g. polymer per cc. void space.

The treated anode was then installed, at an immersion depth of 12 inches, into a stainless steel electrolytic cell which contained a stainless steel cathode. The electrolyte was about 50 pounds of KF·2HF (approximately 40 weight HF and saturated with about 100 g. of LiF).

The above-described cell containing the treated anode was used, essentially continuously, for 27 days for the electrochemical fluorination of ethylene dichloride to fluorinated products including dichlorotetrafluoroethane which is valuable precursor to the polymerizable tetrafluoroethylene. The conditions of the conversion were an electrolyte temperature of about 96° C., an ethylene dichloride feed rate of 55–60 ml. (liquid)/hour, 6–6.5 volts, and a current density of 75 ma./cm. The HF was replaced as it was consumed. During this time the anode pressure did not exceed 3.5 p.s.i.

For a control an electrode which was identical except for not being impregnated with polymer was immersed to a depth of 12 inches in an identical electrochemical conversion apparatus. Within less than one day the anode pressure exceeded 10 p.s.i., the anode eventually plugging off thus hindering introduction of feed material. The product produced contained excessive quantities of overly fluorinated and cracked products. The anode pressure is the pressure required to pass the fluid feed through the anode in the above-described system at the specified rate.

Example II

Another porous anode essentially identical to that of Example I was treated by dipping the bottom 1½ inches into a commercial suspension of Teflon in water. The suspension contained about 60 weight percent Teflon particles and about 0.05 to 0.5 micron in size. This suspension was stabilized by the presence of a small amount of a commercial nonionic emulsifying agent (Triton X-100) of the alkylaryl polyether alcohol type. After dipping the anode was dried at 210° F. for about 16 hours and then heated at 550° F. for one hour to destroy the emusifying agent.

The treated anode was installed in a cell essentially identical to that of Example I where it remained for 24 hours, being used for the electrochemical fluorination of ethylene dichloride until operation was halted due to an unrelated malfunction. The anode was disassembled, and the feed tube, the feed cavity, and the feed fittings were completely free of electrolyte. The bottom 1¾ inches of the anode was a bluish gray and appeared not to have been wetted by the electrolyte. (Although only the bottom 1½ inches of the carbon was dipped, some wicking action had occurred extending the region of treatment an additional ½ inch.) This test showed that the Teflon treatment was successful in preventing invasion of the electrode cavity.

Example III

The run of Example II was essentially repeated except that the cylindrical anode was treated with an aqueous suspension of polyethylene.

The bottom 1½ inches of the anode was impregnated with a commercial suspension of polyethylene (Moropol 700, Moretex Chemical Products, a 30% solids suspension of low molecular weight polyethylene in water, stabilized with a nonionic polyoxyethylene derivative of a long chain compound). The impregnation was carried out at room temperautre and 5.43 g. of solids was deposited in the carbon. This corresponds to about 0.3 g./cc. void space.

Using the same cell and general operating conditions as described in previous examples, the treated anode was tested for the fluorination of ethylene dichloride.

The anode began operating at an anode pressure of 1½ p.s.i. After 8 days of continuous operation the anode pressure was still 1½ p.s.i. At this time the cell was deliberately shut down for about 16 hours to simulate a shutdown from an equipment malfunction. With other untreated anodes, such as shutdown is generally accompanied by an increase in anode pressure when the cell is started up again. However, the treated anode was started up and 2 days later was still operating at 1½ p.s.i.

This test showed that treatment of the anode with a suspension of polyethylene is also suitable.

In another similar test, the entire anode was treated with the above-described polyethylene suspension instead of only the bottom 1½ inches.

When this anode was used in the fluorination cell, it was found to operate erratically with flashing in the cell and with the periodic production of product which was black in color, apparently due to carbonization. The anode also became polarized three times in about the first 3 hours of operation.

The test wherein the entire anode was treated was again repeated but with a treating suspension containing only 15 weight percent solids to deposit only one half as much solids in the porous carbon. Using this anode resulted in somewhat more satisfactory operation, but there was still dark product formation and flashing in the cell.

These latter two tests indicate that impregnation of the entire electrode element is not only unnecessary for satisfactory fluorination, but is actually undesirable.

Example IV

Another porous anode essentially identical to that of Example I was treated by still another embodiment of the invention.

A poly(vinylidene chloride) solution was prepared from 10.2 g. of Saran (Dowex 242 L resin) in about 350 ml. of methyl ethyl ketone at the incipient boiling point of the solution. The bottom 1½ inches of the above-described anode was preheated to 75° C. and was impregnated by immersing of the bottom 1½ inches into the solution. The impregnated anode was then placed in a tube furnace and the solvent was removed by heating in a nitrogen stream at about 100° C. The temperature was then increased to 500° C. and maintained there for about 3 hours to decompose the polymer.

The impregnation, drying, and pyrolysis operation was repeated twice more such that the increase in weight of the impregnated anode after the last pyrolysis was about 2 grams.

The treated anode was then installed, at an immersion depth of 12 inches, into a stainless steel electrolytic cell which contained a stainless steel cathode. The electrolyte was about 50 pounds of KF·2HF (approximately 40 weight percent HF and saturated with about 100 g. of LiF).

The above-described cell containing the treated porous carbon anode was used continuously for electrochemical fluorination of both methane (about 1 week) and ethylene dichloride (about 10 days). The conditions of the conversion were an electrolyte temperature of about 90° C., current density of about 175 ma./cm.$^2$, voltage at about 79 volts, and at feed rates of about 1.5 moles per hour. The HF was replaced as it was consumed. During this 17-day period, the anode pressure did not rise above 5 p.s.i.

As noted by the control runs for Example I anodes of this type could not previously be used for such a long period of time and at such an immersion depth (12 inches) without the anode pressure rapidly exceeding 10 p.s.i. or rapidly plugging off the flow of feed material, or producing excessively large quantities of overly fluorinated or cracked products.

Example V

The following tests were conducted to simulate the resistance to electrolyte invasion of a porous carbon electrode assembly having a pore size at the lower region which is lower than the porosity in the upper region. A section of a relatively tight porous carbon (Stackpole 139 having about 30 percent voids, an average pore size of about 10 microns, and a permeability of about 0.06 darcy) was immersed to a depth of 12 inches in a typical electrochemical fluorination electrolyte and under essentially operating conditions. The cavity in the section of porous carbon, a ½-inch hole extending vertically in the carbon section, was found to be completely free of electrolyte after a 24-hour test.

Specifically, the small pore size carbon anode was a section of 1 x 1 x 6¼ inch material into which had been drilled a ¼-inch hole to within ½-inch of its end. A Teflon-covered length of copper tubing was fitted into the open end of the hole. It was in electrical contact with the carbon and acted as the current collector. The electrolyte was KF·2HF maintained at about 93° C. The bottom of the anode was at a depth of 12 inches from the surface of the electrolyte. For a 24-hour period, a voltage of about 5.5 volts was applied to the anode and no feed material was passed through the anode. The voltage was insufficient to evolve free fluorine but was, nevertheless, considered to be satisfactory for the validity of the electrolyte migration test.

For purposes of comparison, the same test was carried out with a porous carbon anode section which had much larger pores (National Carbon 45 having 50 percent voids and an average pore size of about 55 microns). An anode section was made which was about 4 inches long and had a square cross section with about 1¼ inches on each side. A similar ¼-inch hole was drilled to within ½ inch of the end of this anode and the hole was similarly fitted with a copper current collector. This anode was also maintained in the electrolyte under conditions essentially identical to those described above for 24 hours. At the completion of the test, both anodes were removed and sawed in half to determine the extent of electrolyte penetration.

The results of the examination showed that the fine pore carbon specimen contained no electrolyte in its cavity and there was little or no electrolyte present in any portion of the anode. This was determined by specific gravity determination on selected portions of the carbon. The large pore carbon, on the other hand, was found to contain a large quantity of electrolyte in its cavity and density measurements showed the presence of considerable invasion of the porous material, the extent of invasion increasing with the depth of submersion.

The above tests demonstrate the advantages of using a dual porosity porous carbon anode for electrochemical fluorination. The lower portion of the porous carbon anode requires a small pore size to resist invasion of the electrolyte and to protect the functioning of the electrode cavities. The upper portion requires somewhat greater pore size to permit some migration of electrolyte and an adequate flow of feed material.

While this invention has been described in detail for the purpose of illustration, it is not to be construed as limited thereby but is intended to cover all changes and modifications within the spirit and scope thereof.

We claim:
1. A process for the electrochemical conversion of an organic compound feedstock which comprises: passing an electric current through a current conducting electrolyte composition contained in an electrolysis cell provided with a cathode and a porous anode, the lower 1/50 to ½ portion of said anode having an average effective pore diameter of 0.01 to 35 microns with no significant amount of pores having a diameter of greater than 70 microns, the remainder of said anode having pores within the range of 40 to 150 microns average diameter; introducing said feedstock into said lower portion of said anode and at least partially reacting at least a portion of said feedstock in the pores of said anode; passing product and any remaining unreacted feedstock from within the pores of said anode at a point spaced apart from the point where said feedstock was introduced into said anode; and recovering product from an effluent stream from said cell.

2. A method according to claim 1 wherein said anode is comprised of carbon, wherein said feed is passed through feed distribution channels, said channels being disposed within the portion of said anode having an average effective pore diameter of 0.01 to 35 microns, and thence into said pores, and wherein said electrolyte composition comprises essentially anhydrous liquid hydrogen fluoride, and wherein said product is at least partially fluorinated.

3. A method according to claim 1 wherein said lower 1/50 to 1/2 of said anode contains between 0.0125 and 0.4 gram of pyrolyzed carbonaceous material, and wherein said electrolyte composition comprises essentially anhydrous liquid hydrogen fluoride, and wherein said product is at least partially fluorinated.

4. A method according to claim 1 wherein said porous anode is comprised of carbon wherein said lower 1/50 to 1/2 of said anode contains within the range of 0.0125 to 0.4 gram of polymer per cubic centimeter of void space, and wherein said electrolyte composition comprises essentially anhydrous liquid hydrogen fluoride, and wherein said product is at least partially fluorinated.

5. A method according to claim 4 wherein said polymer is selected from the group consisting of polymers of mono-1-olefins having 2 to 8 carbon atoms per molecule and polytetrafluoroethylene.

6. A method according to claim 5 wherein said pyrolyzed carbonaceous material is carbon produced by the decomposition of a polymer.

7. A process for the electrochemical conversion of a feedstock which process comprises: passing an electric current through a current conducting electrolyte composition contained in a electrolysis cell provided with a first electrode element and a porous second electrode element, the lower 1/50 to 1/2 portion of said porous electrode element having an effective pore diameter of 0.01 to 35 microns with no significant amount of pores having a diameter greater than 70 microns, the remainder of said porous electrode element having pores within the range of 40 to 150 microns average diameter; introducing said feedstock into said lower portion of said porous electrode element and at least partially reacting at least a portion of said feedstock in the pores of said electrode element; passing product and any remaining unreacted feedstock from within the pores of said porous electrode element at a point spaced apart from the point where said feedstock was introduced into said porous electrode element; and recovering product from an effluent stream from said cell.

8. A method according to claim 7 wherein said first electrode element is an anode and said second porous electrode element is a cathode.

References Cited
UNITED STATES PATENTS

| | | | |
|---|---|---|---|
| 2,592,144 | 4/1952 | Howell et al. | 204—247X |
| 3,280,014 | 10/1966 | Kordesch et al. | 204—74X |
| 3,461,050 | 8/1969 | Childs | 204—59 |

JOHN H. MACK, Primary Examiner

N. A. KAPLAN, Assistant Examiner

U.S. Cl. X.R.

204—246, 277, 283, 294